(12) United States Patent
Oehler et al.

(10) Patent No.: US 12,060,045 B2
(45) Date of Patent: Aug. 13, 2024

(54) ELECTROMECHANICAL BRAKE PRESSURE GENERATOR INCLUDING A GEAR AND METHOD FOR MANUFACTURING A GEAR FOR AN ELECTROMECHANICAL BRAKE PRESSURE GENERATOR

(71) Applicant: Robert Bosch GmbH, Stuttgart (DE)

(72) Inventors: Christoph Oehler, Karlsruhe (DE); Claus Oehler, Karlsruhe (DE); Mark Boehm, Lehrensteinsfeld (DE); Martin Uhlig, Ilsfeld (DE); Sebastian Martin Reichert, Affaltrach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 368 days.

(21) Appl. No.: 17/606,144

(22) PCT Filed: Feb. 10, 2020

(86) PCT No.: PCT/EP2020/053253
§ 371 (c)(1),
(2) Date: Oct. 25, 2021

(87) PCT Pub. No.: WO2020/216487
PCT Pub. Date: Oct. 29, 2020

(65) Prior Publication Data
US 2022/0306065 A1   Sep. 29, 2022

(30) Foreign Application Priority Data
Apr. 25, 2019 (DE) .................... 10 2019 205 906.6

(51) Int. Cl.
*B60T 13/74* (2006.01)
*B60T 13/68* (2006.01)
(Continued)

(52) U.S. Cl.
CPC .......... *B60T 13/745* (2013.01); *B60T 13/686* (2013.01)

(58) Field of Classification Search
CPC .. B60T 13/686; B60T 13/745; F16D 2127/06; F16D 2121/24; F16D 65/46; F16D 65/18
(Continued)

(56) References Cited

U.S. PATENT DOCUMENTS 5,611,606 A * 3/1997 Nell ...................... B60T 8/4863
303/155
6,457,783 B1 * 10/2002 Schanzenbach ........ F16D 65/18
303/166
(Continued)

FOREIGN PATENT DOCUMENTS

CN   101528519 A   9/2009
CN   201875110 U   6/2011
(Continued)

OTHER PUBLICATIONS

International Search Report for PCT/EP2020/053253, Issued Apr. 20, 2020.

*Primary Examiner* — Robert A. Siconolfi
*Assistant Examiner* — James K Hsiao
(74) *Attorney, Agent, or Firm* — NORTON ROSE FULBRIGHT US LLP; Gerard A. Messina

(57) ABSTRACT

An electromechanical brake pressure generator for a hydraulic braking system of a vehicle. The electromechanical brake booster includes at least one gear for transferring a torque of the electric motor for brake pressure generation. The gear in this case includes a planetary carrier for supporting planetary wheels, planetary wheels pins which are connected to the planetary carrier and on which the planetary wheels are rotatably fastenable, and a pinion for transferring a drive torque or output torque, which is rotatably fixedly connected to the planetary carrier at a side thereof opposite the plan-
(Continued)

etary wheel pins. At least the part of the planetary carrier that includes the planetary wheel pins is materially integrally formed with the latter from the same material.

10 Claims, 3 Drawing Sheets

(51) Int. Cl.
  *F16D 65/18* (2006.01)
  *F16D 65/46* (2006.01)
(58) Field of Classification Search
  USPC .............................................................. 303/3
  See application file for complete search history.

(56) References Cited

U.S. PATENT DOCUMENTS

| | | | | |
|---|---|---|---|---|
| 8,307,960 | B2* | 11/2012 | Seuser | F16H 57/082 |
| | | | | 188/162 |
| 8,511,437 | B2* | 8/2013 | Glaser | B66B 5/185 |
| | | | | 188/65.1 |
| 8,574,119 | B1* | 11/2013 | Kinter | F16H 57/082 |
| | | | | 475/331 |
| 9,249,876 | B2* | 2/2016 | Yun | F16H 57/082 |
| 9,714,636 | B2* | 7/2017 | Newburg | F02N 11/08 |
| 10,407,041 | B2* | 9/2019 | Heubner | F16H 63/3466 |
| 2008/0293534 | A1* | 11/2008 | Dettenberger | H02K 7/116 |
| | | | | 475/154 |
| 2015/0075923 | A1* | 3/2015 | Jang | F16D 65/14 |
| | | | | 188/162 |
| 2018/0154881 | A1* | 6/2018 | Heubner | F16D 65/14 |
| 2018/0180165 | A1* | 6/2018 | Kirchgessner | F16H 57/023 |

FOREIGN PATENT DOCUMENTS

| | | |
|---|---|---|
| CN | 302526238 S | 8/2013 |
| CN | 103562597 A | 2/2014 |
| CN | 104565330 A | 4/2015 |
| CN | 204477274 U | 7/2015 |
| CN | 108482346 A | 9/2018 |
| CN | 207875608 U | 9/2018 |
| CN | 108860119 A | 11/2018 |
| DE | 102013018946 A1 | 5/2015 |
| EP | 0292648 A2 | 11/1988 |
| EP | 1562275 A1 | 8/2005 |
| EP | 2735767 A1 | 5/2014 |
| EP | 3339686 A1 | 6/2018 |
| JP | 2012135997 A | 7/2012 |
| WO | 2017045804 A1 | 3/2017 |
| WO | 2017089008 A1 | 6/2017 |

* cited by examiner

ELECTROMECHANICAL BRAKE PRESSURE GENERATOR INCLUDING A GEAR AND METHOD FOR MANUFACTURING A GEAR FOR AN ELECTROMECHANICAL BRAKE PRESSURE GENERATOR

FIELD

The present invention relates to an electromechanical brake pressure generator including a gear, a method for manufacturing a gear of an electromechanical brake pressure generator, and a vehicle including an electromechanical brake pressure generator.

The electromechanical brake pressure generator in this case may also be used as a brake booster, in which an input brake force is boosted. The electromechanical brake pressure generator or brake booster includes, in particular, a gear for transferring a torque of the electric motor for brake pressure generation. For the sake of simplicity, reference is made below solely to a brake pressure generator.

BACKGROUND INFORMATION

For decelerating passenger cars, the foot force of the driver is usually insufficient, so that passenger cars are normally equipped with a brake booster. In general, brake boosters frequently operate with an underpressure generated by an internal combustion engine. The pressure difference between the engine pressure and the ambient pressure is utilized here to apply a boosting force to the piston rod of the piston/cylinder unit in addition to the foot force of the driver.

Alternative brake pressure build-up devices are required for future drive concepts of motor vehicles, since underpressure is no longer available for operating a conventional vacuum brake booster. Electromechanical brake pressure generators of interest here have been developed for this purpose.

In this case, the actuation force is generated at the piston-cylinder unit with the aid of an electric motor. Such electromechanical brake pressure generators may be used not only for providing an auxiliary force, but also for alone providing the actuation force in brake-by-wire systems. Electromechanical brake pressure generators are therefore advantageous, in particular, with respect to autonomous driving.

A conventional electromechanical brake booster is described in PCT Patent Application No. WO 2017/045804 A1, which is represented in FIG. 1. In contrast thereto, the present invention is also directed to an electromechanical brake pressure generator capable of applying a brake force regardless of an actuation of the brake pedal. The conventional brake booster 1 includes a spindle nut and an electric motor (not outlined), with the operation of which spindle nut 2 may be set in rotation via a spur gear 3. Spindle nut 2 is operatively engaged with a spindle 4, causing spindle 4 to be set in a translation along its spindle axis 5 with the aid of spindle nut 2 set in rotation. In order for spindle 4 not to rotate concurrently as a result of the rotation of the spindle nut, brake booster 1 includes a bearing arrangement 6, to which spindle 4 is fixedly connected.

Bearing arrangement 6 includes a bracket 6a, at the edges of which two slide bearings 6b are situated. Slide bearings 6b run on tie rods 7, which extend essentially in parallel to spindle axis 5. Spindle 4 is movable via this bearing arrangement 6 in the axial direction and is protected against twisting.

A hydraulic vehicle braking system including an electromechanical brake pressure generator is described in PCT Patent Application No. WO 2017/089008A1, which as a booster generator generates a brake force, in which the brake cylinder actuatable by muscle force is used solely as a setpoint generator for the electromechanical brake pressure generator. The electromechanical brake pressure generator may thus also be activated regardless of the brake cylinder actuatable by muscle force, so that a brake application is also possible in an autonomous driving condition.

SUMMARY

The present invention provided an electromechanical brake pressure generator for a hydraulic braking system of a vehicle. In accordance with an example embodiment of the present invention, the electromechanical brake pressure generator includes at least one gear, which is connected to an electric motor for transferring a torque of the electric motor for brake pressure generation. The gear in this case includes a planetary carrier for supporting planetary wheels, planetary wheel pins, which are connected to the planetary carrier and on which the planetary wheels are rotatably fastenable, and a pinion for transferring a drive torque or output torque, which is rotatably fixedly connected to the planetary carrier at a side of the planetary carrier opposite the planetary wheel pins, at least the portion of the planetary carrier that includes the planetary wheel pins being integrally formed with the planetary wheel pins from the same material.

The gear used is particularly preferably a planetary gear. The required installation space is reduced with the aid of planetary wheels in individual gear stages due to high power density.

Further advantages of planetary wheels are found in the achievable gear ratio and in the noise behavior.

Whereas in a conventional planetary carrier pinion, the planetary wheel pins are introduced into corresponding recesses on the planetary carrier, thereby necessitating large overlapping areas, the planetary carrier including the planetary wheel pins is manufactured from a single part. As a result, by omitting the overlapping areas, it is possible to design the planetary carrier thinner and, moreover, no large tolerances due to manufacturing accuracies are present. As a result, the planetary carrier including the planetary wheel pins may thus be manufactured with a high degree of accuracy, for example, with respect to the planetary axes. Moreover, the number of parts and the assembly time required therefor is reduced.

In accordance with an example embodiment of the present invention, the pinion preferably has a helical gearing. This improves the smoothness and reduces the noise generation, since each tooth pair runs with a continuous transition in and out of the engagement and thus, the transfer of the torque proceeds more uniformly.

In one preferred embodiment of the present invention, the planetary carrier includes a shoulder between planetary wheel pins and pinions, which forms a point of support for components of the gear. A ball bearing, for example, may be placed on this shoulder, via which the component of the gear is mounted relative to the planetary carrier. As a result, no further parts for mounting the component of the gear are necessary. A further function is therefore integrated into the planetary carrier pinion, thus reducing the number of parts and the assembly time for such a gear.

In one further preferred embodiment of the present invention, the pinion is materially integrally connected to the planetary carrier. The planetary carrier and the pinion in this case are manufactured preferably jointly for example, by sintering. A permanent connection is thereby established between the pinion and the planetary wheel pin, so that high drive torques or output torques are transferrable. Such a planetary carrier pinion exhibits good durability.

The pinion is designed preferably as a plastic injection molded part. For the pinion, a plastic may be selected, which has good tribological properties, so that self-lubricating plastics are useable, as a result of which an additional lubricant could be omitted. The pinion in this case may be manufactured, for example, from PEEK (polyetheretherketone). In addition, plastics are more favorable than many other materials and more easily processable by injection molding. Moreover, plastics have a lighter weight. A pinion made of plastic is thus formable in an easy and economical manner.

In one advantageous refinement of the present invention, at least the part of the planetary carrier that forms the planetary wheel pins is a sintered part made of metal. By sintering, it is possible to achieve a high degree of measuring accuracy. As a result, more complex components of this type such as the planetary carrier including the planetary wheel pins are materially integrally manufacturable in one component. The pinion together with the planetary carrier and the planetary wheel pins is preferably also manufactured as a sintered part. In this way, it is possible, due to the open-pored surface produced by the sintering, to utilize the surface as a lubricant depot, in particular, for the pinion, so that the lubrication is improved.

The planetary carrier advantageously also includes component structures made of plastic. The planetary carrier is thus formed from at least two different materials. In this case, the two different materials abut one another. The different materials are preferably alternatingly situated in the planetary carrier. As a result of the component structures made of plastic, which are more flexible as compared to a, for example, metal, and which exhibit a higher damping, it is possible to integrate a damping into the planetary carrier. The plastic is preferably a dual-component plastic. The plastic is preferably PEEK (polyetheretherketone) or POM (polyoxymethylene).

The component structures in this case are preferably constructed in such a way that a power train stiffness to be achieved may be adjusted by the damping and the flexibility of these structures and the overload generated by pressure peaks is reduced. As a result, no additional components such as, for example, mechanical (spring elements), hydraulic (relief valve), or software means are necessary. In return, it is possible to use more favorable components such as plastic, which have a high damping property. This may lower the costs for such an electromechanical brake pressure generator.

In one further advantageous embodiment of the present invention, the component structures are situated in an area between adjacent planetary gear pins. Thus, the planetary carrier includes these component structures between an area that forms the planetary wheel pins. As a result, the planetary wheels rotatably situated on the planetary wheel pins are dampened in such a way that a smoother and thus quieter running of the planetary wheels is possible.

The present invention also provided a method for manufacturing a gear of an electromechanical brake pressure generator. In accordance with an example embodiment of the present invention, at least the planetary carrier and the planetary wheel pins are materially integrally manufactured with the aid of a primary shaping manufacturing method. Planetary gear carriers and planetary wheel pins are thus manufactured together in the same work step. As a result, both parts no longer have to be connected to one another. The use of primary shaping manufacturing methods also allows for wide latitude with respect to shape and surface area.

According to one advantageous embodiment of the present invention, sintering or injection molding is applied as a primary shaping manufacturing method. These manufacturing methods allow bodies of greater complexity to be formed in a simple and economical manner. In addition, the lubrication through the open-pored surface may be improved by sintering. In the case of injection molding on the other hand, a plastic may be selected that has self-lubricating properties.

The present invention further provides a vehicle including an electromechanical brake pressure generator for a hydraulic braking system. With such a vehicle, it is possible to achieve the advantages cited with regard to the electromechanical brake pressure generator. In one preferred embodiment of the present invention, this vehicle may be an automated or fully autonomous vehicle.

BRIEF DESCRIPTION OF THE DRAWINGS

Exemplary embodiments of the present invention are represented in the figures and explained in greater detail in the description below.

DETAILED DESCRIPTION OF EXAMPLE EMBODIMENTS

Figure 1:
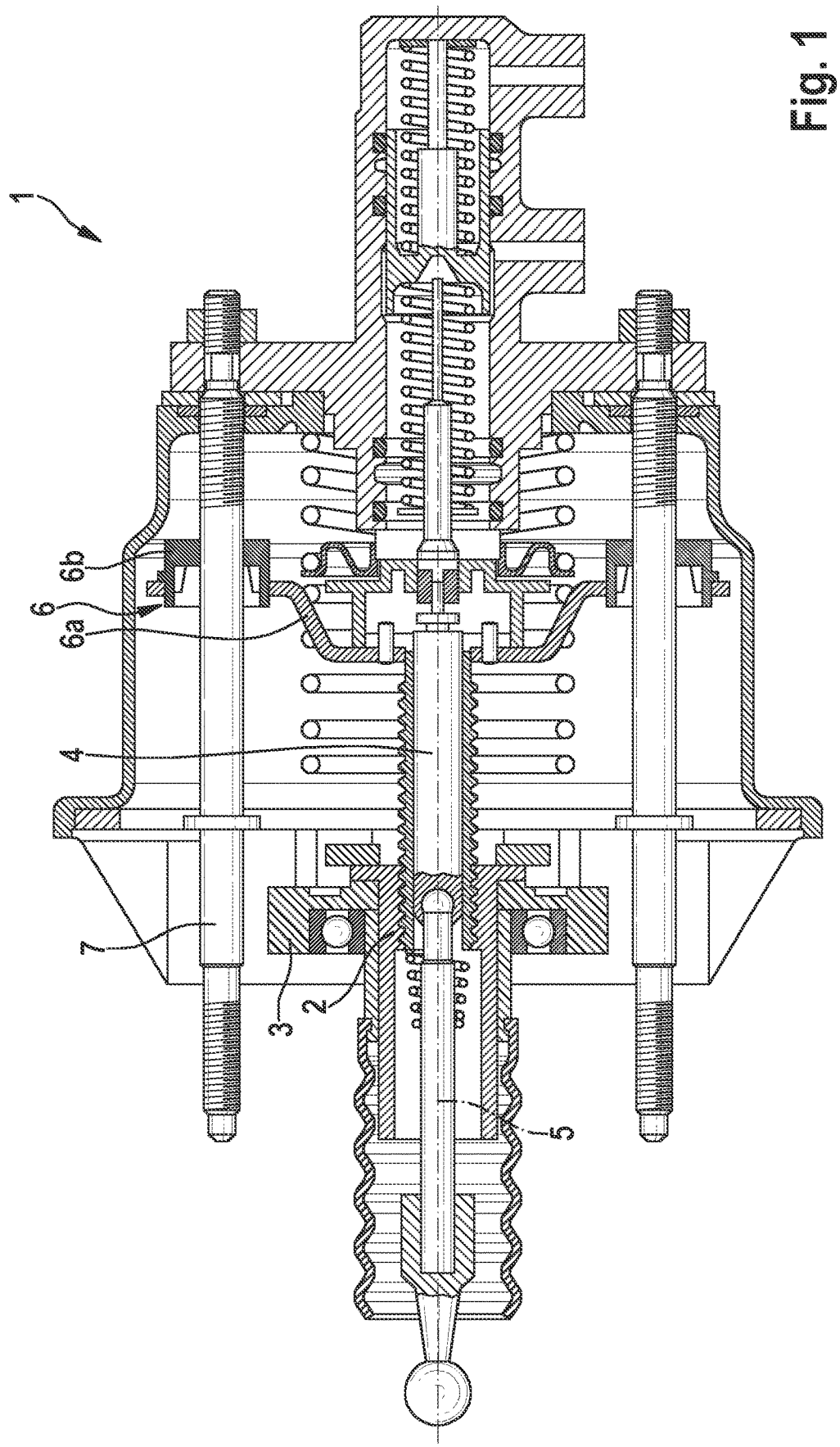
FIG. 1 shows a representation of an electromechanical brake booster from the related art.
Figure 2:
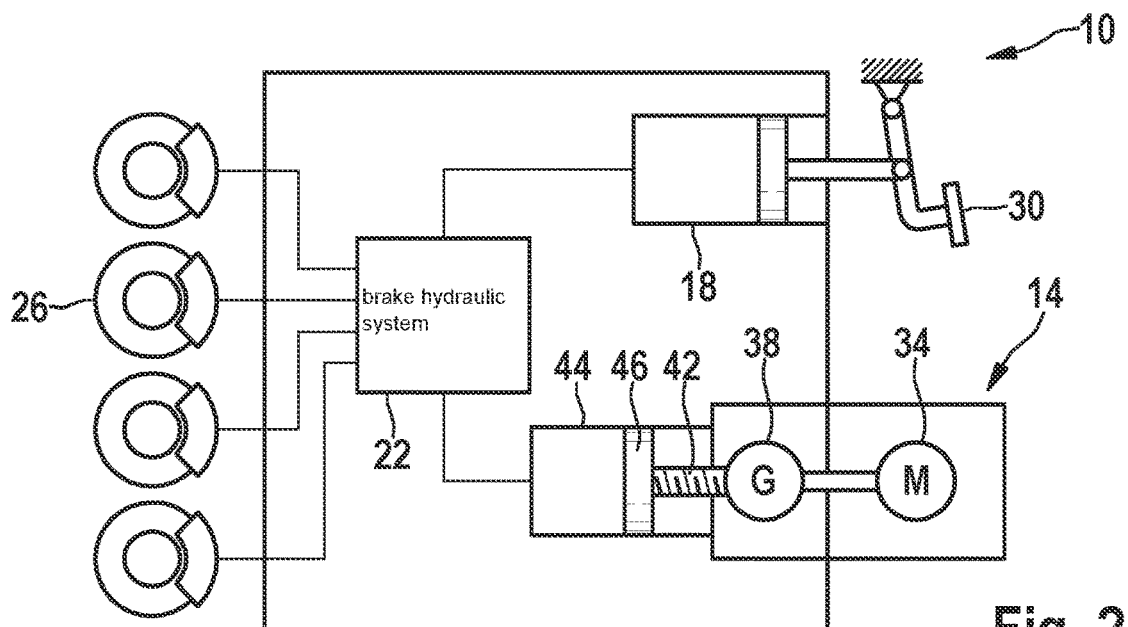
FIG. 2 shows a simplified schematic representation of a hydraulic braking system from the related art for a vehicle including an electromechanical brake pressure generator.

A simplified schematic representation of a hydraulic braking system 10 from the related art for a vehicle including an electromechanical brake pressure generator 14 is shown in FIG. 2. Hydraulic braking system 10 includes electromechanical brake pressure generator 14 and a piston/cylinder unit 18.

Piston/cylinder unit 18 and electromechanical brake pressure generator 14 are both hydraulically connected to a brake hydraulic system 22, which is represented here only as a box.

Brake hydraulic system 22 is formed by various valves and further components to form a, for example, electronic stability program (ESP). In order to be able to decelerate the vehicle, brake hydraulic system 22 is also connected to at least one wheel braking unit 26, so that by a corresponding switching of valves, a brake force may be applied at wheel brake unit 26.

Piston/cylinder unit 18 is actuated using muscle force via a brake pedal 30. In contrast, the brake force of electromechanical brake pressure generator 14 is generated via an electric motor 34. For this purpose, electric motor 34 is connected to a gear 38, for example, a planetary gear, via which a threaded drive arrangement 42 is driven. Threaded drive arrangement 42 is connected to a hydraulic piston 46 situated in a hydraulic cylinder 44, so that a brake force is generatable.

Figure 3:
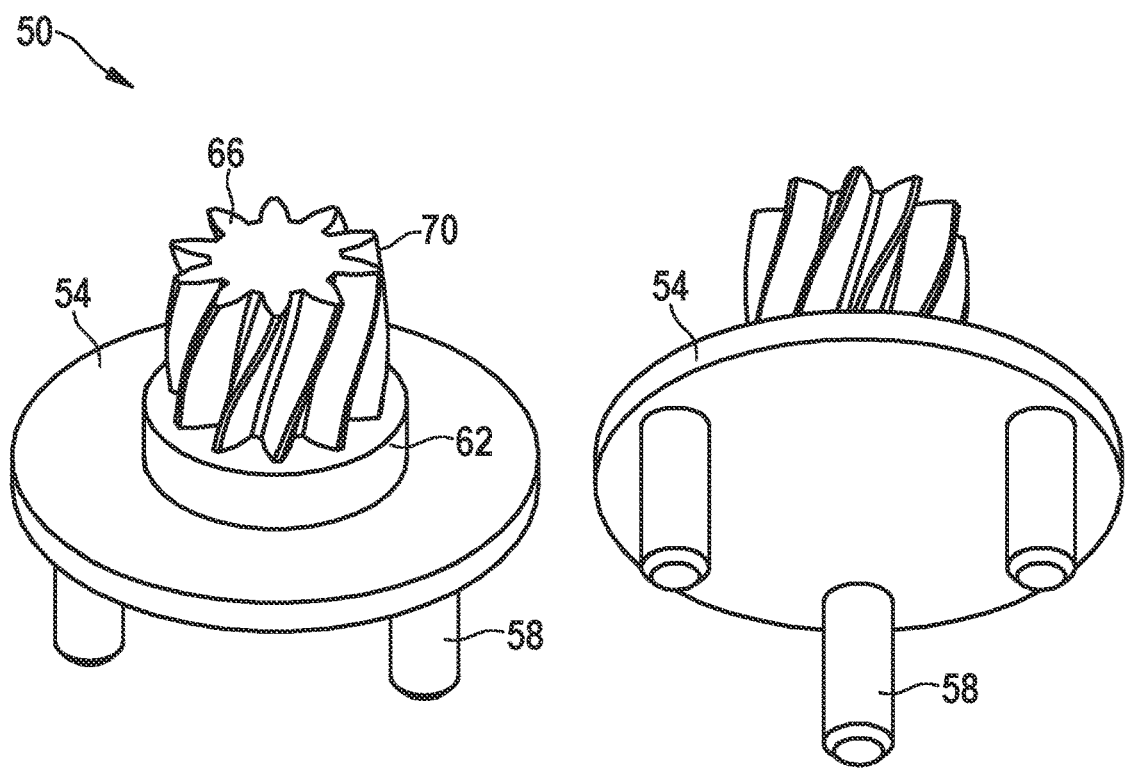
FIG. 3 shows a perspective view of a first exemplary embodiment of a planetary carrier pinion, in accordance with the present invention.

A perspective view of a first exemplary embodiment of a planetary carrier pinion 50 is shown in FIG. 3. Planetary carrier pinion 50 according to the present invention in this case may be used in planetary gear 38 shown in FIG. 2. Planetary carrier pinion 50 includes an essentially circular and disk-shaped planetary carrier 54. Planetary carrier 54 in this exemplary embodiment is formed from a sintered metal.

Planetary wheel pins 58 extending in the axial direction, which are materially integrally formed with the planetary carrier 54, are situated at planetary carrier 54. In this exemplary embodiment, three planetary wheel pins 58 are situated at planetary carrier 54. A planetary gear (not shown) is rotatably fastenable at each of planetary wheel pins 58. Planetary carrier 54 also forms a shoulder 62, which is situated at a side opposite planetary wheel pins 58. This shoulder 62 is coaxially situated and has a smaller diameter than the rest of planetary carrier 54. Shoulder 62 in this case forms a point of support for a further component of gear 38, so that a, for example, ball bearing may be situated at this shoulder 62.

A pinion 66 oriented in the axial direction and coaxially positioned, which is rotatably fixedly connected to planetary carrier 54 and is usable for transferring a drive torque or output torque, is situated at this shoulder 62. Shoulder 62 is accordingly situated between pinion 66 and the rest of planetary carrier 54. Pinion 66 in this exemplary embodiment is materially integrally formed with shoulder 62 and thus with planetary carrier 54 and has a helical gearing 70. In order to be able to mount a bearing on shoulder 62, the outer diameter of pinion 66 is smaller than the diameter of shoulder 62. In this exemplary embodiment, entire planetary carrier pinion 50 is thus formed as a single part, which is manufactured in the form of a primary shaping manufacturing method, for example, with the aid of sintering.

Figure 4:
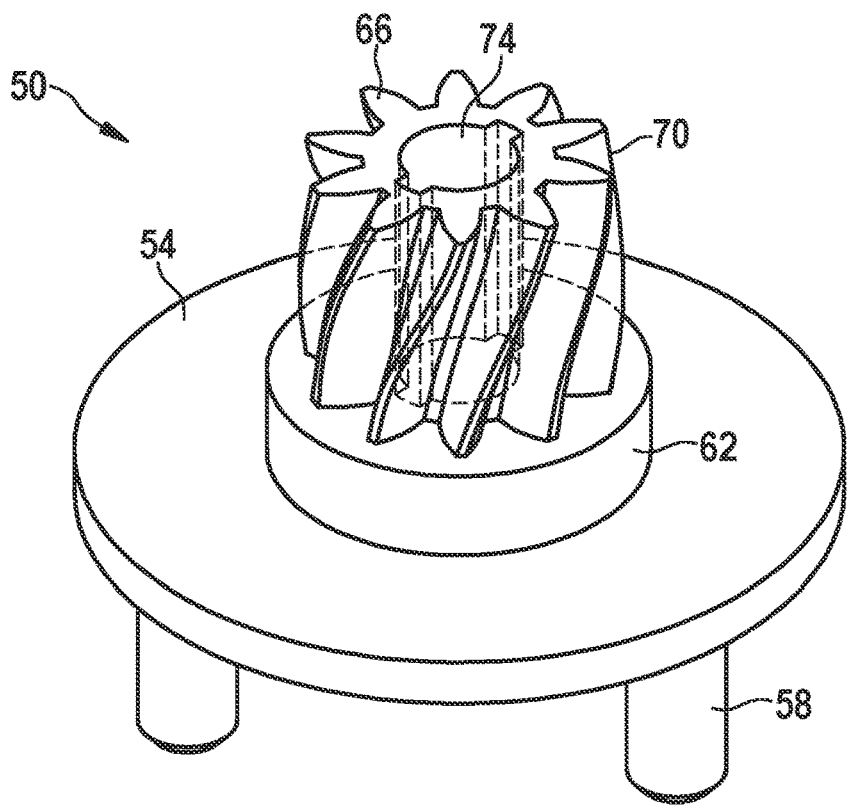
FIG. 4 shows a perspective view of a second exemplary embodiment of a planetary carrier pinion, in accordance with the present invention.

FIG. 4 shows a perspective view of a second exemplary embodiment of planetary carrier pinion 50. This example differs from the first exemplary embodiment shown in FIG. 3 in that pinion 66 is molded onto planetary carrier 54 with the aid of an injection molding method. As a result, planetary carrier 54 and pinion 66 are formed from a different material. To be able to transfer a drive torque or output torque, planetary carrier 54 forms a pinion pin 74 on which pinion 66 is form-fittingly connected to planetary carrier 54.

Figure 5:
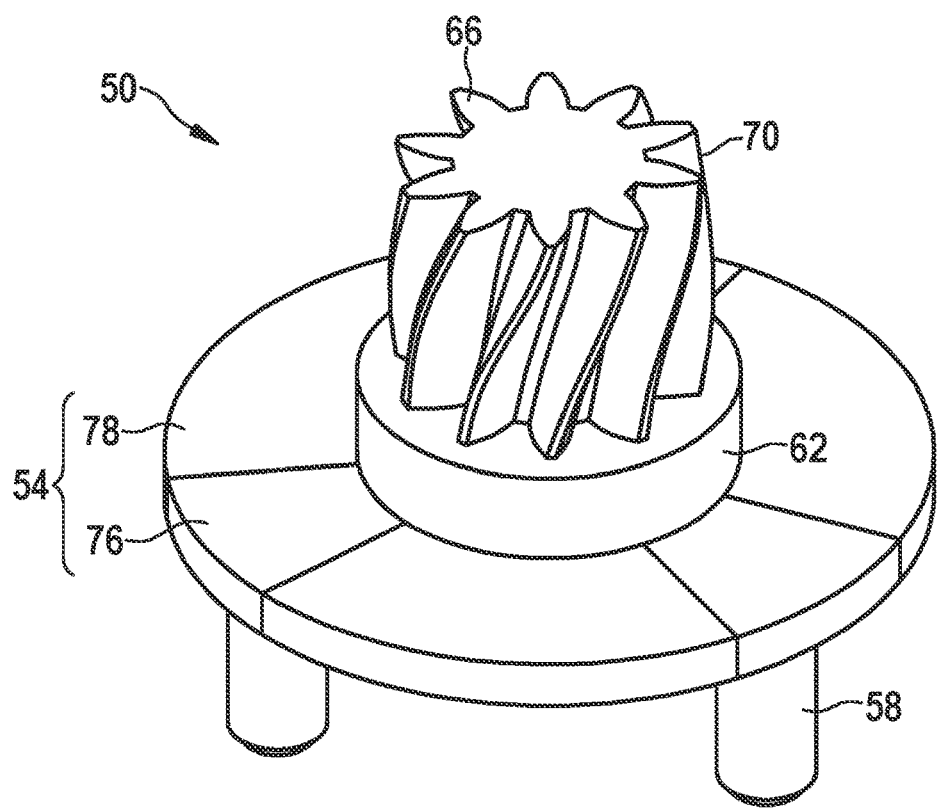
FIG. 5 shows a perspective view of a third exemplary embodiment of a planetary carrier pinion, in accordance with the present invention.

A perspective view of a third exemplary embodiment of planetary carrier pinion 50 is shown in FIG. 5. This exemplary embodiment differs from the first exemplary embodiment shown in FIG. 3 to the extent that only the part of planetary carrier 54 forming planetary wheel pin 58 is formed from a shared material, so that planetary wheel pins 58 are materially integrally connected to planetary carrier 54. In this exemplary embodiment, planetary carrier 54 forms a circle sector 76 in the area of every planetary wheel pin 58. In order to be able to transfer a sufficient load, this material in this case is a sintered metal.

In an area between circle sectors 76, planetary carrier 54 forms a further material. In this exemplary embodiment, planetary carrier 54 includes component structures 78 made of plastic. The plastic in this case is introduced with the aid of injection molding. With these component structures 78, which are flexible and exhibit corresponding damping properties, a particular flexibility and damping of planetary carrier pinion 50 is set, so that a stiffness of the power train may be set. In this way overloads as a result of pressure peaks may be reduced.

In this exemplary embodiment, planetary carrier 54 is also materially integrally connected to shoulder 62 and to pinion 66. Shoulder 62 and pinion in this case are formed from the same material as planetary wheel pins 58 and thus materially integrally connected to these via corresponding circle sectors 76. In this way, a sufficient drive torque and output torque may be transferred via pinion 66 and corresponding circle sectors 76 to the planetary wheels situated at planetary wheel pins 58.

What is claimed is:

1. An electromechanical brake pressure generator for a hydraulic braking system of a vehicle, comprising:
    at least one gear which is connected to an electric motor, the gear configured to transfer a torque of the electric motor for brake pressure generation, the gear including:
        a planetary carrier for supporting planetary wheels,
        planetary wheel pins which are connected to the planetary carrier and on which the planetary wheels are rotatably fastenable, and
        a pinion configured to transfer a drive torque or output torque, the pinion being rotatably fixedly connected to the planetary carrier at a side opposite the planetary wheel pins,
        wherein at least the part of the planetary carrier that includes the planetary wheel pins is materially integrally formed with the planetary wheel pins from the same material.

2. The electromechanical brake pressure generator as recited in claim 1, wherein the planetary carrier includes a shoulder between planetary wheel pins and the pinion, which forms a point of support for components of the gear.

3. The electromechanical brake pressure generator as recited in claim 1, wherein the pinion is materially integrally connected to the planetary carrier.

4. The electromechanical brake pressure generator as recited in claim 1, wherein the pinion is a plastic injection molded part.

5. The electromechanical brake pressure generator as recited in claim 1, wherein at least the part of the planetary carrier that forms the planetary wheel pins is a sintered part made of a metal.

6. The electromechanical brake pressure generator as recited in claim 1, wherein the planetary carrier also includes component structures made of plastic.

7. The electromechanical brake pressure generator as recited in claim 6, wherein the component structures are situated in an area between adjacent planetary wheel pins.

8. A method for manufacturing a gear of an electromechanical brake pressure generator, the gear including a planetary carrier for supporting planetary wheels, planetary wheel pins which are connected to the planetary carrier and on which the planetary wheels are rotatably fastenable, and a pinion configured to transfer a drive torque or output torque, the pinion being rotatably fixedly connected to the planetary carrier at a side opposite the planetary wheel pins, the method comprising:
    materially integrally manufacturing at least the planetary carrier and the planetary wheel pins using a primary shaping manufacturing method.

9. The method as recited in claim 8, wherein the primary shaping method is sintering or injection molding.

10. A vehicle, comprising:

an electromechanical brake pressure generator for a hydraulic braking system, the electromechanical brake pressure generator including:
   at least one gear which is connected to an electric motor, the gear configured to transfer a torque of the electric motor for brake pressure generation, the gear including:
   a planetary carrier for supporting planetary wheels,
   planetary wheel pins which are connected to the planetary carrier and on which the planetary wheels are rotatably fastenable, and
   a pinion configured to transfer a drive torque or output torque, the pinion being rotatably fixedly connected to the planetary carrier at a side opposite the planetary wheel pins,
   wherein at least the part of the planetary carrier that includes the planetary wheel pins is materially integrally formed with the planetary wheel pins from the same material.

* * * * *